(12) United States Patent
Giancotti (10) Patent No.: US 10,968,831 B2
(45) Date of Patent: Apr. 6, 2021

(54) GAS TURBINE AND COMPRESSOR MODULE FOR ON-SHORE LNG PLANTS

(71) Applicant: Nuovo Pignone Tecnologie Srl, Florence (IT)

(72) Inventor: Marco Giancotti, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 335 days.

(21) Appl. No.: 15/761,604

(22) PCT Filed: Sep. 26, 2016

(86) PCT No.: PCT/EP2016/072872
§ 371 (c)(1),
(2) Date: Mar. 20, 2018

(87) PCT Pub. No.: WO2017/055223
PCT Pub. Date: Apr. 6, 2017

(65) Prior Publication Data
US 2018/0347469 A1    Dec. 6, 2018

(30) Foreign Application Priority Data

Sep. 28, 2015   (IT) .......................... 102015000055669

(51) Int. Cl.
*F02C 7/20* (2006.01)
*F16M 1/04* (2006.01)
(Continued)

(52) U.S. Cl.
CPC ................ *F02C 7/20* (2013.01); *F01D 25/28* (2013.01); *F01D 25/285* (2013.01); *F16M 1/04* (2013.01);
(Continued)

(58) Field of Classification Search
CPC ........... F02C 7/20; F01D 15/10; F01D 25/28; F01D 25/285; F16M 1/04; F16M 5/00
See application file for complete search history.

(56) References Cited

U.S. PATENT DOCUMENTS 6,230,481 B1    5/2001   Jahr
2010/0095683 A1*  4/2010   Glynn ...................... F16M 1/04
                                                                60/796
(Continued)

FOREIGN PATENT DOCUMENTS

WO     2014/187786 A2    11/2014

OTHER PUBLICATIONS

Giancotti. M. et al., Modular gas turbine plant with a heavy duty gas turbine, GE Co-Pending Application No. FI2012A000114, filed on Jun. 8, 2012.
(Continued)

*Primary Examiner* — Craig Kim
(74) *Attorney, Agent, or Firm* — Baker Hughes Patent Org.

(57) ABSTRACT

A modular gas turbine system for on-shore LNG plants is disclosed. The module comprises a base plate having a top side and a bottom side and supports on the top side thereof at least a gas turbine engine, a control and electrical room wired to the gas turbine engine, at least part of auxiliaries of the gas turbine engine. Additionally, at least one compressor is supported on the base plate and mechanically coupled to the gas turbine engine and driven into rotation by said gas turbine engine.

9 Claims, 4 Drawing Sheets

(51) Int. Cl.
*F16M 5/00* (2006.01)
*F01D 25/28* (2006.01)
*F01D 25/12* (2006.01)
*F01D 25/20* (2006.01)
*F02C 7/06* (2006.01)
*F02C 7/14* (2006.01)
*F02C 7/268* (2006.01)

(52) U.S. Cl.
CPC .............. *F16M 5/00* (2013.01); *F01D 25/12* (2013.01); *F01D 25/20* (2013.01); *F02C 7/06* (2013.01); *F02C 7/14* (2013.01); *F02C 7/268* (2013.01); *F05D 2230/51* (2013.01)

(56) References Cited

U.S. PATENT DOCUMENTS

2015/0184591 A1* 7/2015 Giancotti ................ F01D 25/28
 60/798
2016/0084110 A1* 3/2016 Giachetti .............. F01D 25/145
 415/1

OTHER PUBLICATIONS

Italian Search Report and Written Opinion issued in connection with corresponding IT Application No. 102015000055669 dated Jun. 13, 2016.
International Search Report and Written Opinion issued in connection with corresponding PCT Application No. PCT/EP2016/072872 dated Nov. 30, 2016.
International Preliminary Report on Patentability issued in connection with corresponding PCT Application No. PCT/EP2016/072872 dated Apr. 3, 2018.

* cited by examiner

GAS TURBINE AND COMPRESSOR MODULE FOR ON-SHORE LNG PLANTS

The disclosure relates to gas turbine systems, specifically for mechanical drive applications. Embodiments disclosed herein specifically concern gas turbine systems for on-shore LNG plants, including one or more gas compressors driven by a gas turbine engine.

BACKGROUND OF THE INVENTION

Gas turbines are widely used as prime movers in power generation or industrial plants, for driving electric generators or other rotary machines, such as compressors. In off-shore installations, compressors driven by aeroderivative gas turbines having a power rate lower than 40 MW are often used, due to their compact structure and reduced overall dimensions. Modularization of gas turbines having a power rate lower than 40 MW is a quite common practice. The gas turbine and the load are arranged on a common frame, thus forming a single unit which is tested in the erection and testing yard or site prior to being transported to final destination. The common frame is then transported to final destination and mounted on a skid. A modular arrangement of this kind is particularly useful, since it allows complete assembling and testing of the rotary machines prior to shipping and installation to final destination.

Large gas turbines, both aero-derivative as well as heavy duty gas turbines above 40 MW, are usually not modularized due to their large dimensions. Commonly, the various components of a gas turbine plant are transported separately from the site of manufacturing to the final destination. The foundation is prepared at the final site of destination and the individual machines are then mounted on the foundation. Due to the different radial dimensions of the various plant components, such as the gas turbine, the electric generator and the starter, the foundation is sometimes designed with machine-supporting surfaces at various different levels. The rotary machines must then be aligned, mechanically connected to one another and tuned. The entire process is extremely time-consuming.

US2015/0184591 discloses a modularized heavy-duty gas turbine engine for power generation, used for driving an electric generator.

There is still a need for improvements in the field of large, heavy-duty gas turbine engines, specifically for certain kinds of mechanical drive applications.

BRIEF DESCRIPTION OF THE INVENTION

A modular gas turbine system for on-shore LNG (i.e. plants for the liquefaction of natural gas) plants, is disclosed. The system comprises:

a base plate having a top side and a bottom side and supporting on the top side thereof at least a gas turbine engine, a control and electrical room wired to the gas turbine engine, at least part of auxiliaries of the gas turbine engine;

at least one compressor, mechanically coupled to the gas turbine engine and driven into rotation by said gas turbine engine.

The module can be assembled, commissioned and tested at an assembling, commissioning and testing site, and then shipped at the final destination, without disassembling the major part of the mechanical, electrical and hydraulic connections, for instance the connections between the control and electrical room of the gas turbine engine, such that starting the system at the final site of use is made faster and easier, with less if no requirement for specialized staff.

If required, some of the components of the system can be disassembled prior to shipping, in particular if this becomes necessary or expedient for logistic purposes. For instance, the compressor(s) can be detached from the gas turbine engine. An interface along the shaft line between the gas turbine engine and the compressor(s) can be provided, which makes disconnection and connection of the compressor to the gas turbine engine easier. In some embodiments, a separable base plate portion can be provided, whereon the compressor(s) is/are mounted. The separable base plate portion can be assembled with the remaining part of the base plate at the time of assembling, commissioning and testing. Thereafter, the separable base plate portion can be separated from the remaining part of the base plate and shipped separately. Re-assembling will take place at the final site of use.

The present disclosure also concerns a method for installing a gas turbine engine and at least one compressor driven by the gas turbine engine on an on-shore supporting structure for an LNG plant, comprising the following steps:

assembling at least a gas turbine engine, at least one compressor, auxiliaries of the gas turbine engine and a control and electrical room of the gas turbine engine on a base plate at a site of assembling, commissioning and testing;

drivingly connecting the at least one compressor to the gas turbine engine forming a gas turbine engine and compressor unit;

commissioning and testing the gas turbine engine and compressor unit;

moving the base plate with the gas turbine engine, auxiliaries thereof and control and electrical room from the site of assembling, commissioning and testing, to a site of installation and use, where a supporting structure extending above a ground level is provided;

lifting the base plate and placing the base plate on the supporting structure.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of an embodiment defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

According to embodiments disclosed herein, a modular gas turbine system 1 is provided, which comprises a base plate 3, whereon several instrumentalities and pieces of machinery are installed. The base plate 3 comprises top surface 3T and a bottom surface 3B. The base plate 3 can be comprised of a lattice of longitudinal and transversal beams. In some embodiments, the structure of the base plate 3 can be designed as disclosed in US2015/0184591, the content whereof is incorporated herein by reference.

On the top surface 3T of the base plate 3 a gas turbine engine 5 can be mounted. The gas turbine engine 5 can be comprised of a compressor section 7, a combustor section 9 and a turbine section 11. The gas turbine engine 5 can comprise a heavy-duty gas turbine, or so-called main frame turbine. The gas turbine engine can alternatively be an aero-derivative gas turbine engine. The gas turbine engine 5 can have a rated power of between about 40 MW and about 150 MW. Exemplary gas turbine engines 5 that can be used in systems according to the present disclosure can be, but are not limited to LM6000 and LMS100 aero-derivative gas turbines, or MS6001, MS7001 and MS9001 heavy duty gas turbines, all available from General Electric, USA.

The gas turbine engine 5 and some of the auxiliaries thereof can be housed in a gas turbine enclosure 12.

The inlet of the compressor section 7 is in fluid communication with a clean-air duct 13, extending between an air filter chamber 15 and the gas turbine engine 5. In some embodiments, the air filter chamber 15 is mounted on the same base plate 3, which supports the gas turbine engine 5. In other embodiments, the air filter chamber 15 can be mounted on a separate base plate or skid. However, installing the air filter chamber 15 on the base plate 3 along with the gas turbine engine 5 can provide additional advantages, as will become apparent from the description herein below of a method of commissioning and installing the gas turbine system.

The gas turbine engine 5 can be further provided with a ventilation outlet duct 17, wherefrom exhaust cooling air from a gas turbine enclosure is discharged. Reference number 18 designate a ventilation fan and reference number 20 designates the ventilation inlet duct, wherefrom ventilation air is taken by the ventilation fan 20.

In some embodiment the gas turbine engine 5 can be provided with an exhaust stack for discharging exhaust combustion gas in the environment. The exhaust stack can be mounted on the same base plate 3 along with the gas turbine engine 5. In other embodiments, the exhaust stack can be mounted on a separate skid, which can be supported on the base plate 3 or, on the ground level. An exhaust duct, fluidly connecting the gas turbine engine 5 and the exhaust stack, can be mounted on the base plate 3.

Figure 1:
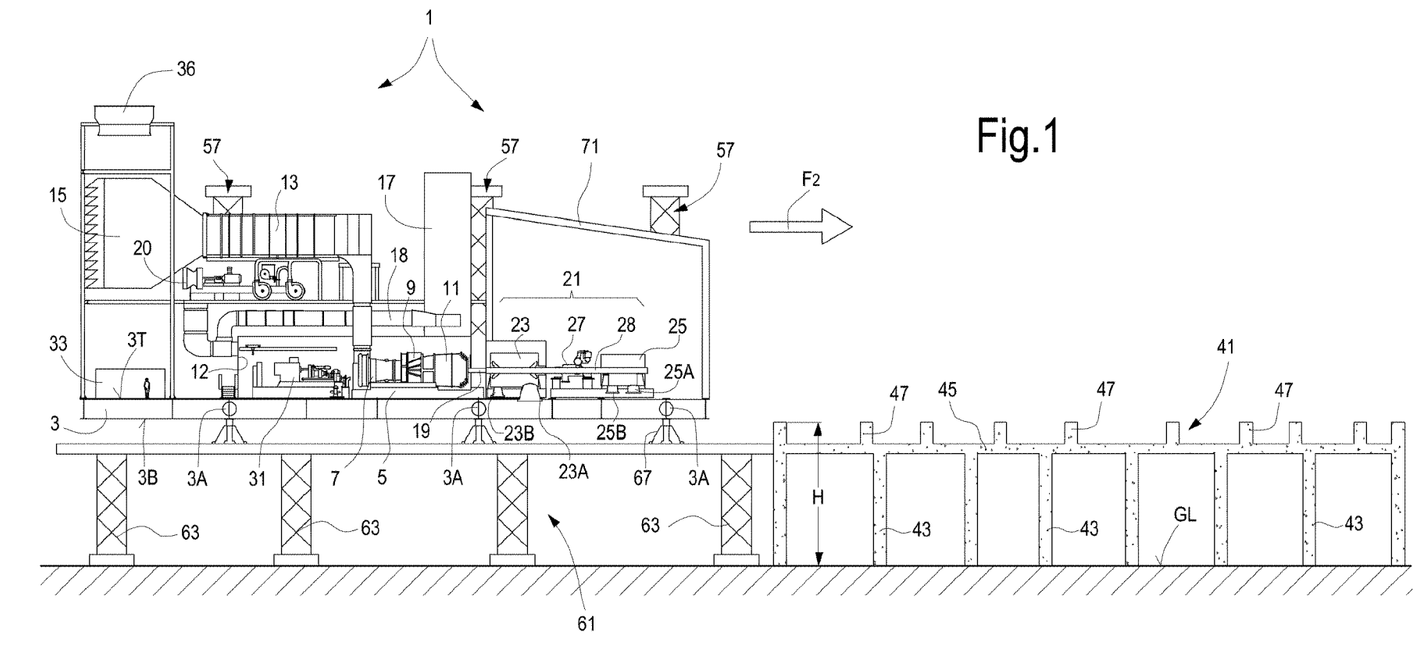
FIG. 1 illustrates a side view of a modular gas turbine system in an intermediate step of the process of placing the system on the final supporting structure in the site of installation and use.
Figure 2:
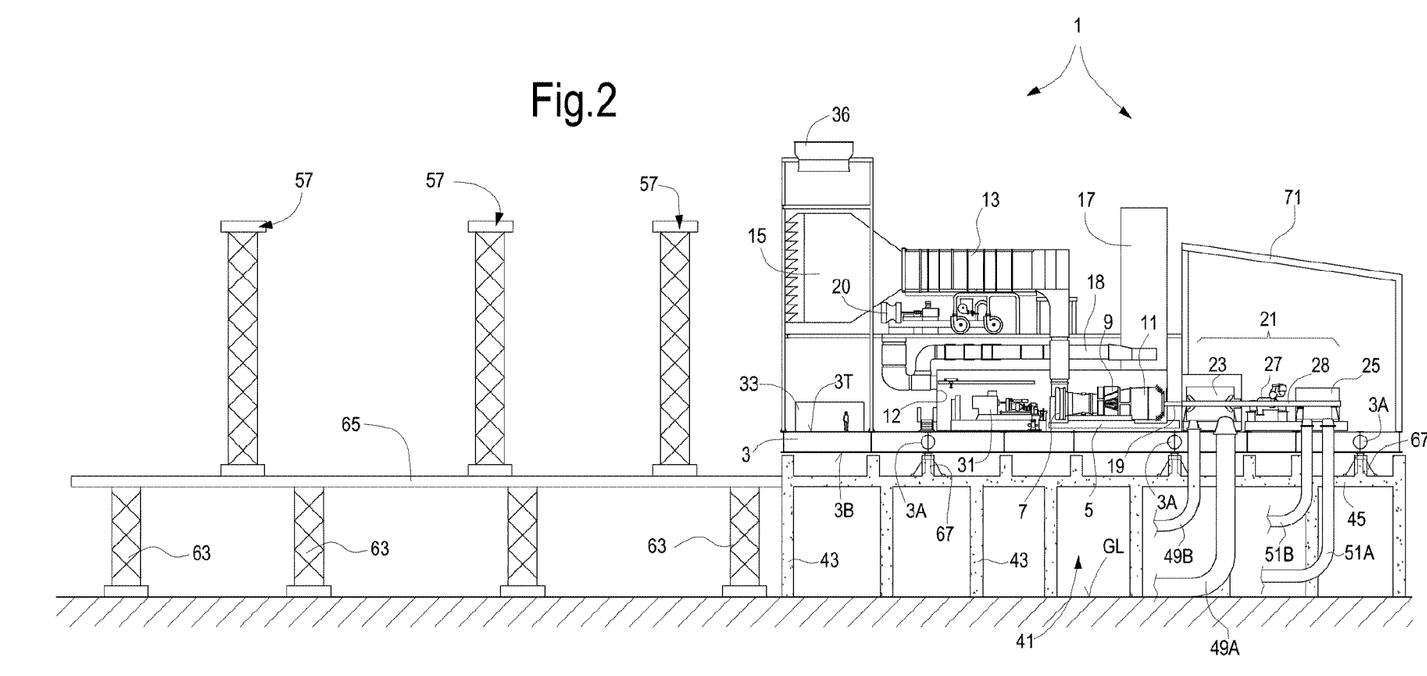
FIG. 2 illustrates a side view of the modular gas turbine system mounted on the final supporting structure.

In the embodiment shown in the attached drawings, the gas turbine engine 5 comprises an output power shaft 19, which can be mechanically coupled to a load. In embodiments disclosed herein, the load comprises one or more compressors. In FIGS. 1 and 2 the load comprises a compressor train 21 comprised of a first compressor 23 and second compressor 25. A shaft line 28 extends from the gas turbine engine 5 to the last compressor 25.

In some embodiments, additional rotating components or machinery, for instance additional compressors, can be arranged along the shaft line 28. In the exemplary embodiment illustrated in the attached drawings, a helper 27 is arranged between compressor 23 and compressor 25. The helper can be comprised of a steam turbine, if steam is available. If the various pieces of equipment arranged along the shaft line 28 require different rotational speeds, one or more gear boxes or other speed manipulating devices can be located along the shaft line 28, such that different pieces of equipment can rotate at different speeds. The steam turbine 27, if present, can be used as a starter motor as well. In other embodiments, an electric machine can be provided along the shaft line 28, which can operate as a starter, or as a helper, or both as a starter and as a helper, if so required.

In some embodiments, not shown, both an electric machine and a steam turbine can be arranged along the shaft line 28.

The electric machine can operate as a helper, as a generator or both as a helper and a generator. The electric machine operating as a helper can provide additional mechanical power to the shaft line 28, in case the gas turbine engine 5 generates insufficient mechanical power to drive the load 21. The additional mechanical power can be generated by converting electric power from an electric power distribution grid, whereto the electric machine can be connected, e.g. through a variable frequency driver.

The electric machine operating as a generator can convert a surplus of mechanical power, generated by the gas turbine engine 5 and exceeding the power required to drive the load 21, into electric power, which can be delivered to the electric power distribution grid, e.g. through a variable frequency driver, if needed.

The electric machine can be a reversible electric machine, suitable for operating selectively as a helper or as an electric generator.

The compressor 23, or the compressor 25, or both the compressor 23 and the compressor 25 can be provided with respective compressor inlet and compressor outlet. In the schematic of FIGS. 1 and 2, references 23A and 23B designate the compressor inlet and the compressor outlet, respectively, of compressor 23. Reference numbers 25A and 25B designate the compressor inlet and the compressor outlet, respectively, of compressor 25. As shown in FIGS. 1 and 2, the compressor inlets 23A, 25A and the compressor outlets 23B, 25B are arranged on the bottom side of respective compressor casings, such that the inlets and outlets are facing the bottom surface 3B of the base plate 3, and therefore towards the ground level, once the base plate 3 is arranged in the final position of use.

In some embodiments, the compressors 23 and 25 are refrigerant compressors for an LNG plant, to process one or more refrigerant fluids circulating in a refrigeration cycle, to remove heat from a flow of natural gas, which shall be liquefied for transportation purposes.

According to some embodiments, one or both compressors 23, 25 can be BCL-series, barrel-type centrifugal compressors. A BCL compressor comprises a barrel with a horizontal axis and a front closure flange. The compressor rotor, including the impellers of the compressor, and the stationary components of the compressor, i.e. the diaphragms forming the diffusers and the return channels, can be extracted according to an extraction movement parallel to the rotation axis of the compressor, i.e. parallel to the axis of the barrel.

In other embodiments, one or both compressors 23, 25 can be MCL-series, horizontally split centrifugal compressors. In particular, the casing of an MCL compressor comprises two casing portions connectable to each other along a horizontal plane. The inner components of the compressor, i.e. the diaphragms and the rotor, can be removed by lifting the upper casing portion, without the need for moving the lower casing portion.

In yet further embodiments, a first one of said compressors 23, 25 can be an MCL-series, horizontally split centrifugal compressor and the other compressor can be a BCL-series centrifugal compressor. The BCL-series compressor can be arranged at the end of the shaft line 28, such that the barrel can be opened and the inner components of the compressor can be removed without dismantling the barrel.

If the compressor train 21 comprises only one compressor, this latter can be either a horizontally split compressor, or a BCL compressor. In this manner, maintenance of the compressor is made easier. Indeed, the compressor casing of any one of said compressors of the compressor train can be opened, e.g. for maintenance or repairing purposes, without removing the compressor from the shaft line 28.

The inlet and outlet of said compressor(s) are arranged so to face downwardly towards a ground level. This makes maintenance of the compressor(s) easier. In case of MCL compressors, for instance, since both the inlet and outlet are arranged on the lower casing portion, the upper casing portion can be removed without dismounting the pipes connected to the compressor inlet and outlet.

At the same time, since the inlet and outlet of the compressor(s) are downwardly oriented, easy access to the compressor(s) is obtained during operation thereof. This aspect facilitates both maintenance and safety in particular in case of emergency.

The gas turbine engine 5 is provided with a plurality of auxiliaries and ancillary equipment, among which: turbine enclosure, ventilation circuit and ventilation fan(s), helper motors, e.g. electric helper motors, starter motor, fuel skid, water mist firefighting skid, exhaust frame ventilation system, lubrication oil circuit including a lubrication oil cooler, oil pump, oil filters, oil mist eliminators, seal gas panel skids, water washing skids, dry fuel gas scrubber skid, transformers and the like.

Some or all said auxiliaries can be mounted on the base plate 3. In the schematic of FIGS. 1 and 2, reference number 31 designates some of the auxiliaries of the gas turbine engine 5, which are mounted on the base plate 3.

Gas turbine engine 5 and relevant auxiliaries are controlled via instrumentalities, which are located in a control and electrical room 33, which can be installed on the base plate 3. In some embodiments, the control and electrical room 33 is located under the air-filter chamber 15, such as to reduce the overall footprint of the apparatus and devices mounted on the base plate 3. Additional auxiliaries can be arranged above the air-filter chamber 15, such as a lubrication oil cooler 36.

According to preferred embodiments, the above described gas turbine system 1 can be intended for on-shore installations and can be mounted on top of a supporting structure 41, which is provided at the site of installation and use of the gas turbine system 1. The supporting structure 41 can be made of concrete and can extend above ground level GL by a height H. The supporting structure 41 can be comprised of vertical columns or uprights 43 supporting a slab 45. A plurality of plinths 47 can project from a top surface of the slab 45 and form a resting surface for the base plate 3 of the gas turbine system 1. Beneath the slab 45 vertically oriented, straight inlet and outlet ducts extend, which are fluidly coupled to the inlet and outlet of compressors 23, 25, once the gas turbine system 1 has been mounted on the supporting structure 41. In FIG. 2 reference numbers 49A and 49B designate the inlet duct and outlet duct for compressor 23, respectively, while reference numbers 51A and 51B designate the inlet duct and outlet duct for compressor 25, respectively.

In other embodiments, the supporting structure 41 can be comprised of vertically extending uprights or columns 43, and devoid of a horizontal slab.

The gas turbine system 1 described so far can be assembled, commissioned and tested at a site of assembling, commissioning and testing. The various apparatus, devices and instrumentalities, including the control and electrical room, the gas turbine engine, the auxiliaries thereof and the load can be mounted on the same base plate 3. All wiring and fluid connections required can be completed and the system can run under load conditions.

Once commissioning and testing has been completed, the fully modularized gas turbine system 1 can be shipped to the site of installation and use. All the wiring and connections made when the system has been assembled, commissioned and tested can be maintained.

Installation of the full module on top of the supporting structure 41 can be made as shown in FIGS. 1, 2 and 3(A)-3(D) and described herein below. The gas turbine system 1 can be transported, e.g. by means of trailers 55, at ground level GL and brought on a side of the supporting structure 41. For instance, the trailers 55 can be configured and arranged to move the base plate 3 and relevant apparatus, devices and instrumentalities supported thereon in a direction parallel to the rotation axis of the gas turbine engine 5 and to the shaft line 28. Adjacent the supporting structure 41 a temporary lifting structure is arranged. The temporary lifting structure can be comprised of two rows of lifting columns 57, between which the base plate 3 is positioned by means of trailers 55.

The base plate 3 can be provided with anchoring points 3A, whereto lifting members 59 supported by the lifting columns 57 can be connected. The lifting members 59 are configured and controlled to lift the base plate 3 and relevant machinery supported on top thereof up to a height H1, substantially corresponding to or slightly larger than the final height at which the base plate 3 shall be positioned, when installed on the supporting structure 41. FIGS. 3(A) and 3(B) show the lifting movement F1.

Once the base plate 3 has been brought at height H1, a set of temporary support frames 61 is mounted underneath the base plate 3 and between the lifting columns 57. The temporary support frames 61 can comprise a plurality of uprights 63 and a horizontal overhead floor 65, as shown in FIG. 3(C). Skid shoes 67 are provided for resting the base plate 3 on top of the overhead floor 65.

Once the base plate 3 is placed on the top surface of the overhead floor 65, as shown in FIGS. 1 and 3(C), the base plate 3 can be shifted parallel to the rotation axis of the gas turbine engine 5 and moved, according to arrow F2, from the overhead floor 65 in the final position on the supporting structure 41, as shown in FIGS. 2 and 3(D). The base plate 3 is then made to rest on the plinths and anchored thereto and/or directly to the slab 45, while the skid shoes 67 can be removed. The temporary support frames 61 and the lifting columns 57 can be disassembled and removed.

Once the base plate 3 has been mounted on top of the supporting structure 41, the compressor inlets and outlets 23A, 23B and 25A, 25B can be fluidly coupled to the vertically extending straight inlet and outlet ducts 49A, 49B and 51A, 51B. The height H of the supporting structure 41 is selected such that the distance between the compressor inlets and outlets 23A, 23B and 25A, 25B and the ground level GL is sufficient to arrange straight inlet and outlet ducts 49A, 49B and 51A, 51B, whose axial length is a multiple N of the respective inner diametrical dimension, wherein N is at least 3, and in some embodiments N is between 3 and 15, between 4 and 11. The axial dimension of the straight inlet and outlet ducts allows a more uniform gas flow profile at the compressor inlet and outlet to be obtained, thus positively influencing the compressor efficiency, and also reducing the flow losses due to vorticity in the gas flow.

If the supporting structure 41 only comprises vertically extending uprights and is devoid of a horizontal slab, the base plate 3 can be placed on top of the supporting structure 41 using a different system, e.g. by means of lifting cranes.

While in the above described embodiment, all the instrumentalities of the gas turbine system 1 are installed on the base plate 3, such that the system forms a single module which can be shipped after commissioning and testing to the final site of installation and use, without disconnecting any of the components forming the system 1, in other embodiments, the module can be split in two or more sub-modules. This may be convenient or become necessary based on existing constraints, e.g. if along the itinerary of the module, from the site of assembling, commissioning and testing to the site of final installation and use, limitations to the overall dimensions or weight of the module exist. In this case, the various components of the gas turbine system 1 can be divided into pre-assembled units or sub-modules in a convenient manner, i.e. in such a way as to reduce the work required for disconnecting and re-connecting the sub-modules again.

According to some embodiments, for instance, the air-filter chamber 15 can be mounted on a separate base plate, while the remaining components of the gas turbine system 1 are installed on one single base plate 3. The separate base plate supporting the air-filter chamber 15 can be mounted on the supporting structure 41, or on a separate supporting structure, if so required, which can be placed on the ground level, e.g. on the side of the base plate 3.

According to other embodiments, the compressor train 21, or part thereof, can be mounted on an auxiliary, separable base plate portion, which can be separated from the remaining base plate 3.

Figure 4:
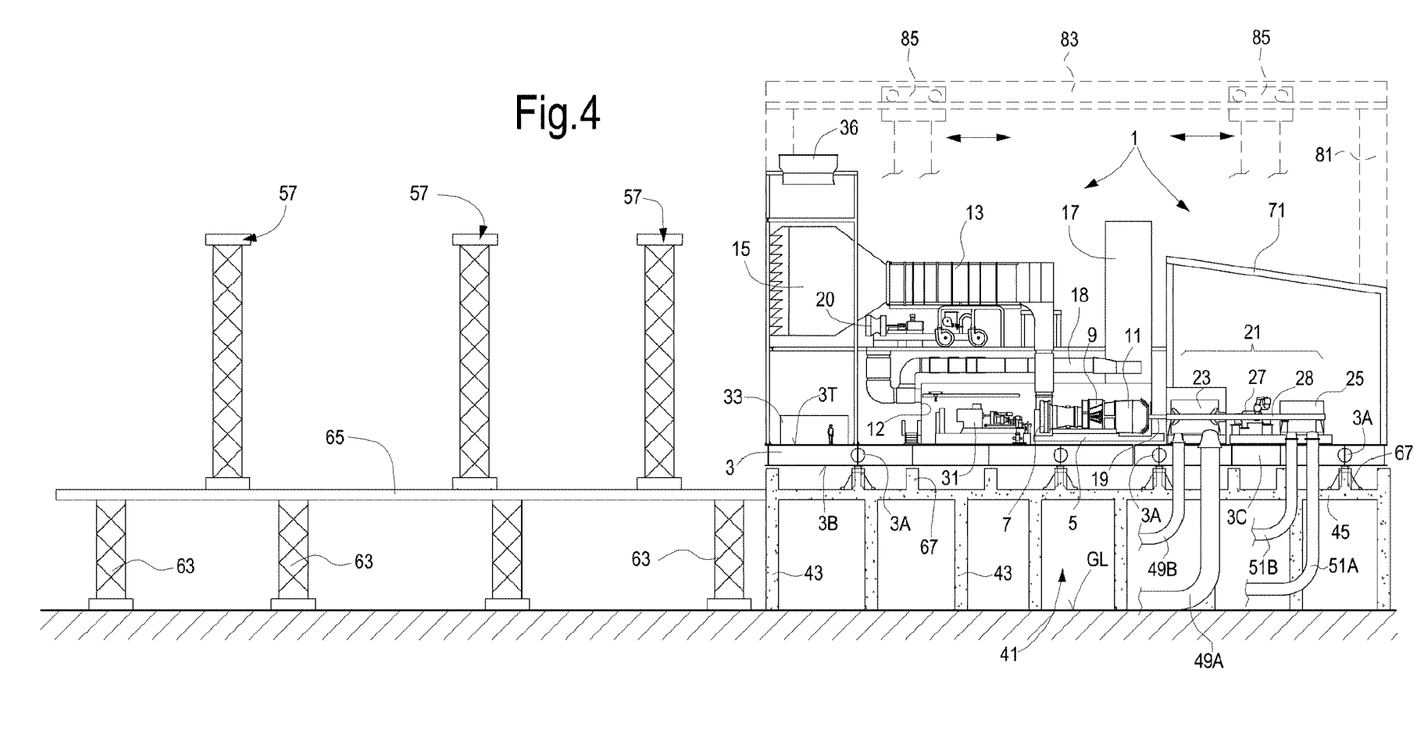
FIG. 4 illustrates a side view similar to FIG. 2 of a further embodiment of the modular gas turbine system of the present disclosure.

FIG. 4 illustrates a gas turbine system 1 according to the present disclosure on the supporting structure 41, in a side view similar to FIG. 2. The same reference numbers indicate the same or equivalent components, parts or elements as shown in FIG. 2, which are not described again herein. In FIG. 4 an auxiliary base plate portion is schematically shown at 3C. The base plate portion 3C can be assembled with the remaining part of the base plate 3, during assembling, commissioning and testing. If required by logistic constraints, the base plate portion 3C with the instrumentalities supported thereon, in particular the compressor(s), can be separated from the remaining of the base plate 3 after testing, such that two sub-modules can be separately shipped at the final destination. There the base plate portion 3C supporting the compressor train 21 and the remaining of the base plate 3 can be lifted and transferred on top of the supporting structure 41 separately from one another and the assembled together.

Alternatively, the base plate portion 3C can be assembled to the remaining part of the base plate 3 prior to lifting the complete base plate 3 in the same way as described above in connection with FIGS. 1, 2 and 3(A)-3(D), using the same lifting columns 57 and the same frames 61.

If the two base plate portions are lifted separately on the structure 41, the base plate portion 3C and the remaining part of the base plate can be lifted sequentially using the same lifting columns 57 and frames 61. In other embodiments, two separate sets of lifting columns 57 and frames 61 on opposite sides of the supporting structure 41 can be used to separately lift the two base plate portions.

The majority of the wiring and connections between the control and electrical room on the one side and gas turbine engine 5 on the other will be preserved, such that the time needed to re-assemble the pre-assembled units into which the system has been split is reduced.

If the environmental conditions in which the gas turbine system 1 will operate so require, a protective enclosure can be provided around some or all the machinery installed on the base plate 3. For instance, an enclosure 71 can be arranged around the compressor train 21. The enclosure 71 can be comprised of protective panels or similar structure, e.g. for winterizing the system, i.e. for protecting the machinery arranged inside the enclosure 71 from severe environmental conditions, such as extreme low temperatures, providing a so-called winterizing protective structure.

Figure 3:
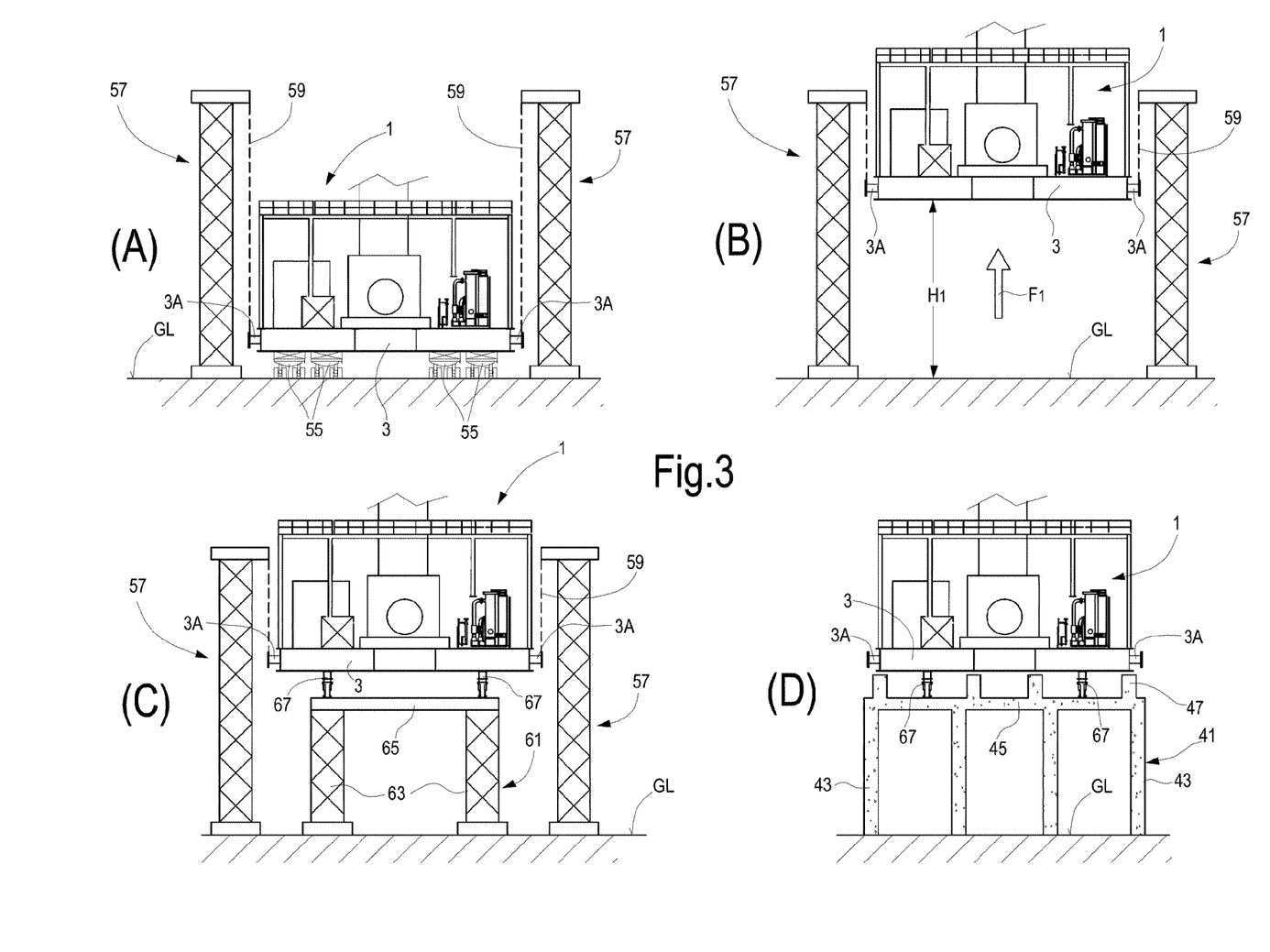
FIGS. 3(A)-3(D) illustrate various steps of transferring the modular gas turbine system from a ground level to its final position in the site of installation and use.

In the embodiment of FIGS. 1 to 3 the modular gas turbine system 1 is a single deck system, wherein the machinery is arranged on the top surface 3T of the base plate 3. In other embodiments, a multi-deck structure can be provided. FIG. 4 illustrates by way of example a two-deck structure, wherein above the base plate 3 uprights 81 and cross-beams 83 are provided, which can support one or more overhead travelling cranes, schematically shown at 85. The overhead travelling crane(s) can be used to move machinery components on the base plate 3. The overhead traveling crane(s) and relevant crossbeams supporting them form a second deck of the gas turbine system 1, arranged above the first deck formed by the base plate 3 and the relevant machinery supported thereby. The two decks can be assembled at a site of assembling, commissioning and testing, and then disassembled when the system 1 is shipped to the final site of destination, where the two decks are assembled once again. In other embodiments, the complete multi-deck system can be shipped from the site of assembling, commissioning and testing to the final site of destination, without disassembling and re-assembling the two decks.

Two-deck modularized systems as shown in FIG. 4 are fully independent, since the equipment needed for moving the various machinery components and instrumentalities of the system are supported by the base plate 3. In other embodiments, overhead travelling cranes or other lifting and handling equipment can be located in an external shed or building which houses the system 1. In yet further embodiments, cranes and similar lifting and handling equipment can be placed in an open space surrounding the system 1, if sufficient room is available and if the environmental conditions so permit.

In further embodiments, not shown, a multi-deck modular system can be provided, wherein the rotary machines are placed on separate and superposed decks.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

The invention claimed is:

1. A modular gas turbine system for on-shore LNG plants, the modular gas turbine system comprising:
   a base plate having a top side and a bottom side and supporting on the top side thereof equipment including at least a gas turbine engine, a control and electrical room wired to the gas turbine engine, and at least one auxiliary of the gas turbine engine;
   at least one compressor, mechanically coupled to and driven by the gas turbine engine, comprising an inlet and an outlet;
   an inlet duct connected to the inlet and an outlet duct connected to the outlet;
   a supporting structure extending from a ground level and having a top surface supporting the base plate and the at least one compressor, the supporting structure comprising an extension extending vertically from a ground level such that the inlet duct and the outlet duct extend between the at least one compressor and the ground level.

2. The modular gas turbine system of claim 1, wherein the inlet duct and the outlet duct are straight.

3. The modular gas turbine system of claim 1, wherein the at least one compressor is supported on the base plate.

4. The modular gas turbine system of claim 1, wherein the at least one compressor is supported on a separable base plate portion.

5. The modular gas turbine system of claim 1, further comprising an air filter chamber fluidly connected to the gas turbine engine and supported on the base plate.

6. The modular gas turbine system of claim 5, wherein a lubrication oil cooler is arranged above the air filter chamber.

7. The modular gas turbine system of claim 5, wherein the control and electrical room is arranged underneath the air filter chamber.

8. The modular gas turbine system of claim 1, wherein the at least one auxiliary of the gas turbine engine is selected from the group consisting of: a gas turbine enclosure, a ventilation circuit and ventilation fan, a helper motor, a starter motor, a fuel skid, a water mist firefighting skid, an exhaust frame ventilation system, a lubrication oil circuit including a lubrication oil cooler, an oil pump, oil filters, oil mist eliminators, seal gas panel skids, water washing skids, a dry fuel gas scrubber skid, a seal gas panel skid, transformers, or combinations thereof.

9. The modular gas turbine system of claim 1, further comprising a protective enclosure at least partly surrounding the equipment supported by the base plate.

\* \* \* \* \*